Nov. 15, 1949      J. A. MORRONE      2,488,427

ANTISKID DEVICE FOR VEHICLE TIRES

Original Filed Feb. 28, 1947

Inventor:
Joseph A. Morrone
by
Attorneys

Patented Nov. 15, 1949

2,488,427

UNITED STATES PATENT OFFICE 2,488,427

ANTISKID DEVICE FOR VEHICLE TIRES

Joseph A. Morrone, Westerly, R. I., assignor to Morrone Manufacturing Co., Westerly, R. I., a corporation of Rhode Island Original application February 28, 1947, Serial No. 731,531. Divided and this application October 23, 1947, Serial No. 781,686

4 Claims. (Cl. 152—225)

The object of my invention is to provide a novel, effective and inexpensive anti-skid device for vehicle tires, which device may be readily attached directly to and detached from the tire, thereby eliminating the necessity of providing additional elements for securing the anti-skid device in position.

My invention comprises an anti-skid device for removable attachment directly to a vehicle tire in any desired position around the tire, said anti-skid device comprising a spiral spring stretchable across the tire tread and having means at its ends for removably engaging the tire upon opposite sides of its tread.

Figure 1:
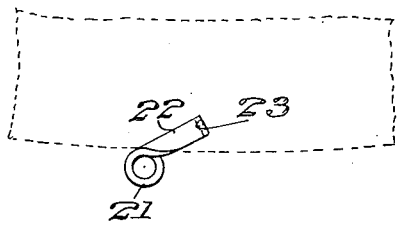
Figure 2:
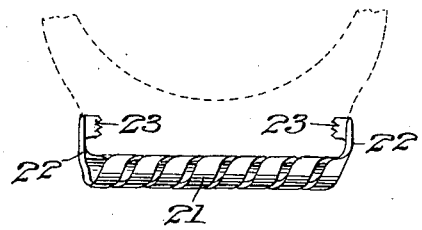

A practical embodiment of my invention is represented in the accompanying drawings in which Fig. 1 represents an end view of one form of anti-skid device in which an intermediate spiral spring of ribbon material has means for removably engaging the tire, a portion of the tire being shown in dotted lines; and Fig. 2 represents a side view of the same.

In the embodiment illustrated the intermediate portion 21 of the anti-skid device is shown as a spiral spring of ribbon material having inclined end portions 22 terminating in inwardly directed toothed ends 23 for removably engaging the tire on opposite sides of its tread. It will be noted that these ends 23 are turned inwardly substantially in the plane of the inclined end portions 22 so that the ends will be at an angle to the circumference of the tire, thereby reducing the tendency of the anti-skid device to creep along the tire and thus cause the ends to cut the tire.

It will be noted that the inwardly turned ends 23 of the form shown are caused to bite into the tire.

In actual practice as many anti-skid devices may be attached to the tire as may be desired. It will be seen from the above description that the anti-skid device may be readily attached to and removed from the tire. It will also be observed that no additional elements are required to attach the anti-skid device to the tire.

This application is a division of my co-pending application filed February 28, 1947, Serial No. 731,531, now Patent No. 2,441,670, dated May 18, 1948.

It is evident that various changes may be resorted to in the construction, form and arrangement of the several parts without departing from the spirit and scope of my invention, and hence I do not intend to be limited to the particular embodiment herein shown and described, but what I claim is:

1. An anti-skid device adapted to be secured directly to a vehicle tire and comprising a spiral spring stretchable across the tire tread and provided with end portions terminating in inwardly directed ends for biting into the tire on opposite sides of its tread.

2. An anti-skid device adapted to be secured directly to a vehicle tire and comprising a spiral spring stretchable across the tire tread and provided with end portions terminating in inwardly directed toothed ends for biting into the tire on opposite sides of its tread.

3. An anti-skid device adapted to be secured directly to a vehicle tire and comprising a spiral spring stretchable across the tire tread and provided with inclined end portions terminating in inwardly directed ends for biting into the tire on opposite sides of its tread.

4. An anti-skid device adapted to be secured directly to a vehicle tire and comprising a spiral spring stretchable across the tire tread and provided with inclined end portions terminating in inwardly directed ends for biting into the tire on opposite sides of its tread, said ends being turned inwardly substantially in the plane of their inclined end portions for reducing the tendency of the anti-skid device to creep along and cut the tire.

JOSEPH A. MORRONE.

REFERENCES CITED

The following references are of record in the file of this patent:

UNITED STATES PATENTS

| Number | Name | Date |
|---|---|---|
| Re. 15,386 | Ratzburg | June 13, 1922 |
| 1,087,312 | Matson | Feb. 17, 1914 |
| 1,587,313 | Hisanosuke | June 1, 1926 |
| 1,858,965 | Nagamine | May 17, 1932 |
| 2,330,839 | O'Brien | Oct. 5, 1943 |

FOREIGN PATENTS

| Number | Country | Date |
|---|---|---|
| 539,065 | Great Britain | Aug. 27, 1941 |